United States Patent
Freitag et al.

(10) Patent No.: US 6,532,200 B1
(45) Date of Patent: Mar. 11, 2003

(54) VOLTAGE SUPPLY ADAPTABLE TO CURRENT HIGHEST VOLTAGE DEMAND

(75) Inventors: Thomas Freitag, Algermissen (DE); Holger Zimmermann, Hildesheim (DE); Dieter Baas, Auenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/622,655
(22) PCT Filed: Feb. 24, 1999
(86) PCT No.: PCT/DE99/00493
§ 371 (c)(1),
(2), (4) Date: Nov. 17, 2000
(87) PCT Pub. No.: WO99/44110
PCT Pub. Date: Sep. 2, 1999

(30) Foreign Application Priority Data

Feb. 28, 1998 (DE) .......................... 198 08 606

(51) Int. Cl.⁷ ................................. G11B 3/90
(52) U.S. Cl. ...................................... 369/53.1
(58) Field of Search .............................. 369/53.1, 53.38, 369/53.42, 53.43, 53.45, 2; 360/67

(56) References Cited

U.S. PATENT DOCUMENTS

| 4,598,255 A | 7/1986 | Min-Tai |
| 5,834,913 A | 11/1998 | Akagi et al. |

FOREIGN PATENT DOCUMENTS

| DE | 196 42 343 | 4/1998 |
| JP | 08 273291 | 10/1996 |

*Primary Examiner*—Paul W. Huber
(74) *Attorney, Agent, or Firm*—Kenyon & Kenyon

(57) ABSTRACT

An electrical device allows voltage to be supplied with minimal power loss. The electrical device has elements with differing supply voltage demands. The same supply voltage is supplied in each case to the elements. The supply voltage can be switched over. The supply voltage is set as a function of the currently highest voltage demand of the elements. The electrical device can be configured as a playback device for optical memory disks, and can include a device for driving an optical memory disk inserted into the playback device and for positioning a scanning unit.

9 Claims, 2 Drawing Sheets

VOLTAGE SUPPLY ADAPTABLE TO CURRENT HIGHEST VOLTAGE DEMAND

This application is a 371 of PCT/DE 99/00493, filed Feb. 24, 1999.

BACKGROUND INFORMATION

Playback devices for optical memory disks, in the form of compact disc players, are already known. German Patent Application No. 196 42 343, not pre-published, describes a compact disc drive that has a motor for rotation of a compact disc clamped between two plates. In addition, a read head is mounted on a transport mechanism that moves the read head radially over the compact disc.

SUMMARY OF THE INVENTION

The electrical device according to the present invention has, in contrast, the advantage that the supply voltage can be adapted in each case to the currently highest voltage demand, so that power losses are avoided. The use of the same supply voltage for the means also results in an elimination of additional voltage supply units and thus a savings in material, space, and cost.

Minimizing the dissipation power also results in the advantage that less space is required for cooling surfaces to discharge the dissipation power.

It is advantageous that provision is made for a playback mode in which the supply voltage does not fall below a first predefined value. As a result, when an optical storage disk is played back, only the energy necessary for that purpose is consumed, and no unnecessary dissipation power is produced.

A further advantage is the fact that a vibration mode is provided, in which the supply voltage does not fall below a second predefined value. This makes possible a higher control loop gain during playback in the presence of vibration, so that vibration-related interference in the scanning of an optical memory disk by the scanning unit can be better compensated for.

It is furthermore advantageous that the supply voltage is set by a switching power supply. As a result, no additional losses occur when the voltage is lower than the full available supply voltage.

It is also advantageous that an analysis circuit is present which ascertains the highest currently required voltage demand of the means, and as a function of that voltage demand delivers a control signal to set the supply voltage necessary therefor. The result is to make possible automatic adaptation of the supply voltage to the currently highest voltage demand of the means, so that the electrical device is automatically operated at every point in time with the lowest possible dissipation power.

A further advantage lies in the fact that a means for feeding in and/or ejecting an optical memory disk is provided, to which the supply voltage is conveyed; and that the supply voltage is set as a function of the voltage demand of that means. The functionality of the voltage supply system is thereby further enhanced, and the space and material for an additional power supply for feeding in or ejecting an optical memory disk are eliminated.

A further advantage is the fact that the supply voltage is set as a function of the voltage demand for feeding in and/or ejecting the optical memory disk, so that a higher supply voltage necessary for that purpose also needs to be made available only for the infeed or ejection operation, thus economizing on dissipation power.

A further advantage is the fact that an infeed/eject mode for feeding in or ejecting an optical memory disk is provided, in which the supply voltage does not fall below a third predefined value. The result is to ensure that the energy necessary for feeding in or ejecting the optical memory disk is made available when necessary.

DRAWINGS

DETAILED DESCRIPTION

Figure 1:
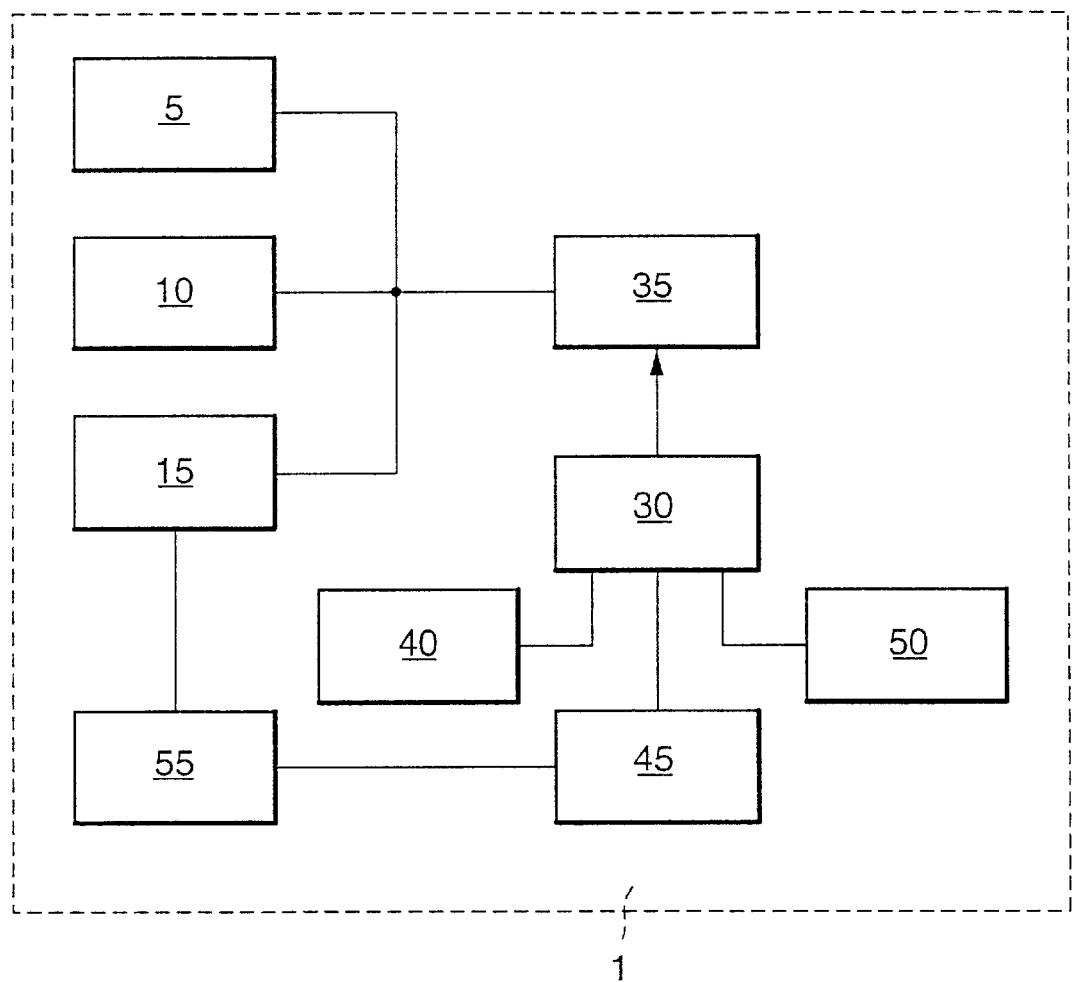
FIG. 1 shows a block diagram of an electrical device according to the present invention.

In FIG. 1, 1 designates an electrical device configured as a compact disc player, i.e. a playback device for optical memory disks, in particular compact discs or CD-ROMs. Compact disc player 1 has a drive motor 10 for rotationally driving a compact disc clamped between two plates. Compact disc player 1 furthermore has motors and actuators, combined under the reference character 15, which move a scanning unit 55 radially over the compact disc and compensate by way of control circuits, within a control range, for the influence of vibration on the positioning of scanning unit 55. A loading motor 5, which allows a compact disc to be fed into and/or ejected from the drive of compact disc player 1, can also be provided in compact disc player 1. A voltage supply unit 35 of compact disc player 1 supplies exactly one supply voltage to loading motor 5 for feeding in or ejecting an optical memory disk, to drive motor 10 for rotationally driving an optical memory disk, and to means 15 for positioning scanning unit 55, so that the same supply voltage is conveyed in each case from voltage supply unit 35 to loading motor 5, to drive motor 10, and to means 15 for positioning scanning unit 55. Voltage supply unit 35 is triggered by an analysis circuit 30 that is connected to an input unit 40, an error detector 45, and a compact disc sensor suite 50 in an insertion slot for an optical memory disk. Error detector 45 is additionally connected to scanning unit 55.

By way of input unit 40, the user can switch compact disc player 1 to a playback mode for playing back a compact disc inserted into compact disc player 1. By way of input unit 40 he or she can also, however, terminate a playback mode that currently exists and cause ejection of a compact disc present in the drive of compact disc player 1. Sensor suite 50 makes it possible to detect the insertion of a compact disc into the insertion slot, thus causing further infeed into the drive of compact disc player 1 by way of loading motor 5. Sensor suite 50 can also, upon ejection of a compact disc from the drive of compact disc player 1, detect termination of the ejection operation after a predefined ejection position has been reached, in order to cause loading motor 5 to shut off in order to terminate the ejection operation. A focus error and/or track error signal determined when a compact disc is scanned by scanning unit 55 is conveyed to error detector 45. As a function of the amplitude of the corresponding focus error and/or track error signal, error detector 45 causes an increase in the supply voltage via analysis circuit 30. This makes possible a subsequent increase in the control circuit gain for means 15 for positioning scanning unit 55, in order to counteract possible vibrations as the cause of increased amplitudes of the focus error and/or track error signal.

Analysis circuit 30 contains, for example, a drive processor that triggers voltage supply unit 35 to set a supply voltage as a function of the currently highest voltage demand of loading motor 5, drive motor 10, and means 15 for positioning scanning unit 55.

Figure 2:
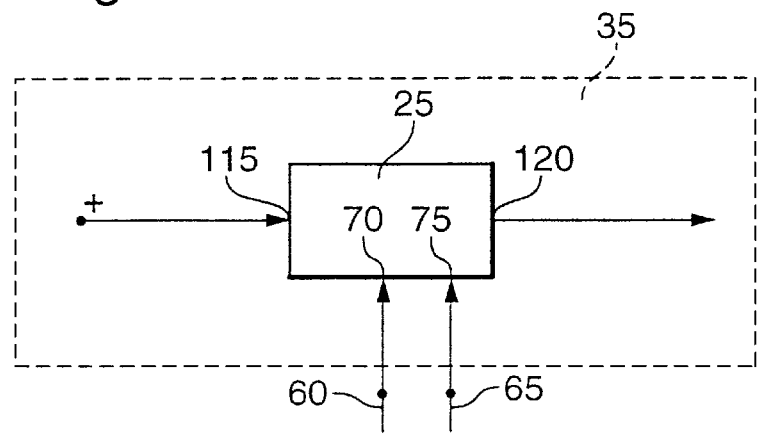
FIG. 2 shows a circuit arrangement for triggering a switching power supply.

FIG. 2 depicts a voltage supply unit 35 triggered by analysis circuit 30; the depiction does not show the drive processor of analysis circuit 30, but only a first control output 60 and a second control output 65 of the drive processor. First control output 60 is connected to a first digital control input 70 of a switching power supply 25 of voltage supply unit 35. Second control output 65 is connected to a second digital control input 75 of switching power supply 25. In addition, a supply voltage (+) is conveyed to switching power supply 25 via a third input 115. The desired supply voltage for loading motor 5, drive motor 10, and means 15 for positioning scanning unit 55 is then present at an output 120 of switching power supply 25. By way of the two input signals at control inputs 70, 75 of switching power supply 25, it is thus possible, from supply voltage (+), to set at switching power supply 25 four different voltages for supplying voltage to loading motor 5, drive motor 10, and means 15 for positioning scanning unit 55, or to switch over among four different voltages derived from supply voltage (+). If a different voltage supply should be necessary in each case for loading motor 5, drive motor 10, and means 15 for positioning scanning unit 55, it is then possible to ensure the voltage supply necessary in each case by appropriately selecting supply voltage (+) and the four possible switching states of switching power supply 25.

Figure 3:
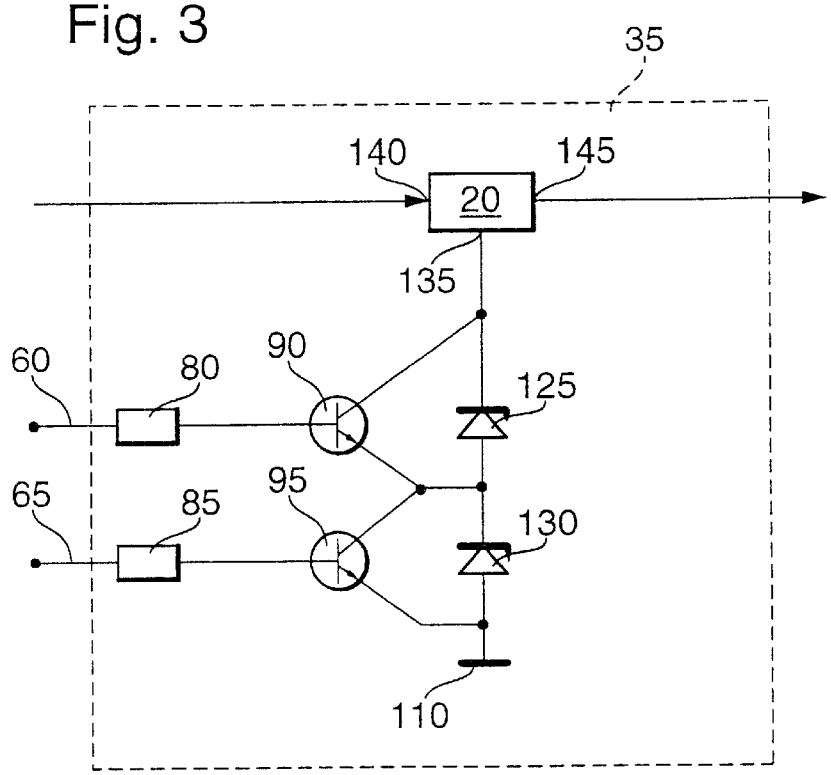
FIG. 3 shows a circuit arrangement for triggering a voltage supply unit comprising a direct-axis controller.

FIG. 3 indicates an alternative voltage supply unit 35 triggered by analysis circuit 30. In this, first control output 60 of the drive processor (also not depicted in FIG. 3) of analysis circuit 30 is connected via a first base dropping resistor 80 to the base of a first npn bipolar transistor 90 whose collector is connected to a base 135 of a direct-axis controller 20 and whose emitter is connected to the collector of a second npn bipolar transistor 95. Second control output 65 is connected via a second base dropping resistor 85 to the base of second npn bipolar transistor 95, whose emitter is connected to a reference potential 110. Connected to the collector of first npn bipolar transistor 90 is the cathode of a first Zener diode 125 whose anode is connected to the emitter of first npn bipolar transistor 90. Connected to the emitter of first npn bipolar transistor 90 is the cathode of a second Zener diode 130 whose anode is connected to reference potential 110. An input voltage is conveyed to an input 140 of direct-axis controller 20. A fixed voltage of, for example, 7 volts, set by a control circuit independently of the input voltage, is present between an output 145 of direct-axis controller 20 and base point 135. First npn bipolar transistor 90 and second npn bipolar transistor 95 can be made conductive or inhibited via first control output 60 and second control output 65, respectively. Depending on how Zener diodes 135, 130 are switched in, four different voltage values can therefore be set between output 145 of direct-axis controller 20 and reference potential 110, and conveyed to loading motor 5, drive motor 10, and means 15 for positioning scanning unit 55.

Figure 4:
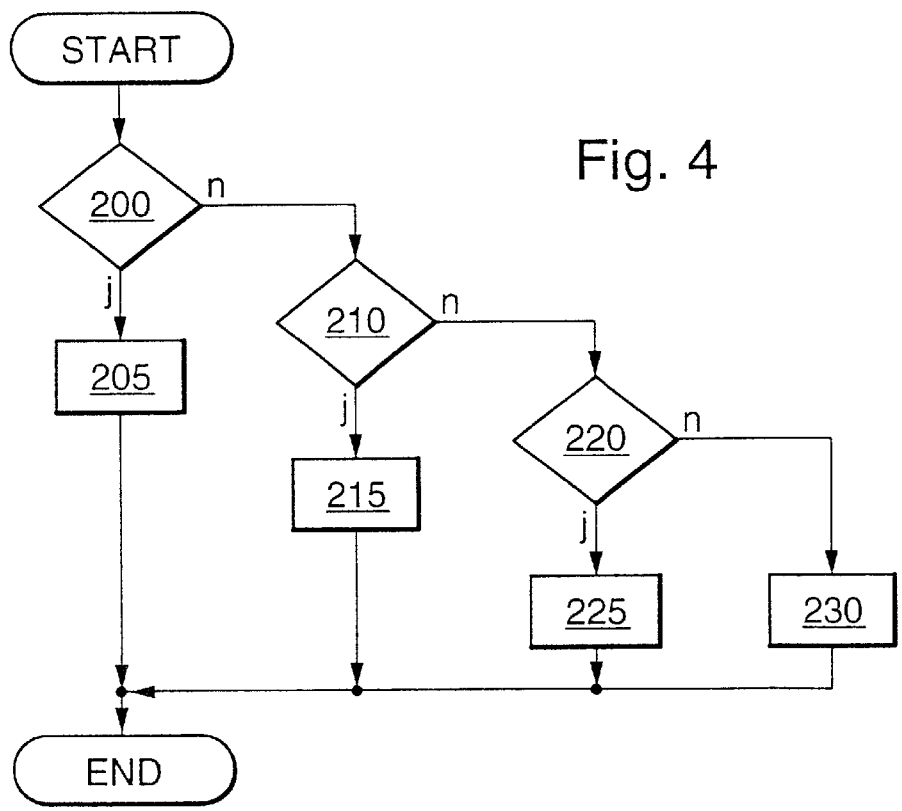
FIG. 4 shows a flow chart for the operation of an analysis circuit arranged in the electrical device.

FIG. 4 depicts a flow chart describing the manner of operation of analysis circuit 30 for triggering voltage supply unit 35. At a program point 200, analysis circuit 30 checks whether sensor suite 50 has detected insertion of a compact disc into the drive of compact disc player 1. If so, then execution branches to program point 205; otherwise execution branches to program point 210. At program point 205, control signals that cause, at voltage supply unit 35, a switchover to the necessary supply voltage for loading motor 5 (if the necessary voltage is not already set at voltage supply unit 35) are applied to the two control outputs 60, 65. The program is then terminated. At program point 210, a check is made as to whether the amplitude of the focus error and/or track error signal detected by error detector 45 exceeds a predefined value. If so, execution branches to program point 215; otherwise execution branches to program point 220. At program point 215, control signals that cause a switchover of voltage supply unit 35 to the supply voltage required by means 15 for positioning scanning unit 55 for counteracting vibrations (if that voltage is not already set by voltage supply unit 35) are conveyed to the two control outputs 60, 65. The program is then terminated. At program point 220, a check is made as to whether a normal playback mode, for playing back a compact disc inserted into the drive of compact disc player 1, has been requested on input unit 40. If so, execution branches to program point 225; otherwise execution branches to program point 230. At program point 225, control signals that cause a switchover in voltage supply unit 35 in order to supply drive motor 10 with the voltage necessary for playback mode (if that voltage has not already been set at voltage supply unit 35) are conveyed to the two control signal outputs 60, 65. The program is then terminated. At program point 230, control signals that cause voltage supply unit 35 not to deliver supply voltage are conveyed to the two control signal outputs 60, 65, since no supply voltage has been requested. The program is then terminated.

Using the example of voltage supply unit 35 shown in FIG. 3, the corresponding switchover operations to generate the necessary voltage supply will be described below. It will be assumed in this context that the maximum voltage is necessary for the operation of loading motor 5, and the lowest voltage for the operation of drive motor 10. For the case in which loading motor 5 is to be operated, both npn bipolar transistors 90, 95 are inhibited, so that the maximum voltage can be tapped off between output 145 of direct-axis controller 20 and reference potential 110. For the operation of loading motor 5, the voltage must not fall below this value. For the operation of means 15 for positioning scanning unit 55,one of the two Zener diodes 125, 130 is bypassed via the corresponding parallel-connected npn bipolar transistor 90, 95, thus making available between output 145 of direct-axis controller 20 and reference potential 110 a voltage which is a minimum for the operation of means 15 for positioning scanning unit 55. For the operation of drive motor 10, both Zener diodes 125, 130 are bypassed via parallel-connected npn bipolar transistors 90, 95, so that the voltage between output 145 of direct-axis controller 20 and reference potential 110 does not fall below the value necessary for the operation of drive motor 10, and corresponds to the fixed voltage of direct-axis controller 20.

If the flow chart shown in FIG. 4 is continuously cycled through, the supply voltage is then automatically adapted to the currently highest voltage demand, so that dissipation power can be minimized. As soon as sensor suite 50 has detected the end of a compact disc infeed or ejection operation, the voltage supply is switched over to the next-lowest required voltage value. When the currently highest voltage demand is determined by means 15 for positioning scanning unit 55 due to the influence of vibration, then a switchover of the voltage supply to the next-lowest voltage value (in the example described) for the operation of drive motor 10 occurs as soon as error detector 45 detects an amplitude of the focus error or track error signal that is below the predefined value.

If the currently highest voltage demand is determined by drive motor 10, what then occurs in the example described above after the playback operation is complete, for example after the total playing time of the compact disc has elapsed or as a result of an input command on input unit 40, is deactivation of the voltage supply.

The present invention described is also applicable to any other electrical device having means with differing supply voltage demands, for example including automobile radios and CD-ROM drives.

What is claimed is:

1. An electrical device comprising:

a plurality of elements having differing supply voltage demands; and means for providing a same supply voltage to each of the elements, the supply voltage being able to be switched over, the supply voltage being set as a function of a currently highest one of the supply voltage demands of the elements.

2. The electrical device according to claim 1, wherein the electrical device is a playback device for optical memory disks, and further comprising a device for driving an optical memory disk inserted into the playback device and for positioning a scanning unit.

3. The electrical device according to claim 2, wherein the playback device has a playback mode in which the supply voltage does not fall below a first predefined value.

4. The electrical device according to claim 2, wherein the playback device has a vibration mode in which the supply voltage does not fall below a second predefined value.

5. The electrical device according to claim 1, further comprising a direct-axis controller for setting the supply voltage and at least one controlled switch for switching over an output signal of the controller.

6. The electrical device according to claim 1, further comprising a switching power supply for setting the supply voltage, an output voltage of the switching power supply being switched over as a function of at least one control signal.

7. The electrical device according to claim 1, further comprising an analysis circuit for ascertaining the currently highest supply voltage demand and for delivering, as a function of the currently highest supply voltage demand, at least one control signal to set a necessary supply voltage.

8. The electrical device according to claim 2, further comprising first means for at least one of feeding in the optical memory disk and ejecting the optical memory disk, the first means receiving the supply voltage, the supply voltage being set as a function of a voltage demand of the first means.

9. The electrical device according to claim 8, wherein the playback device has an infeed/eject mode for feeding in or ejecting the optical memory disk in which the supply voltage does not fall below a third predefined value.

\* \* \* \* \*